(12) United States Patent
Yamaguchi

(10) Patent No.: US 11,174,930 B2
(45) Date of Patent: Nov. 16, 2021

(54) DRIVE FORCE TRANSMISSION MECHANISM, IMAGE FORMING APPARATUS AND BELT MANUFACTURING METHOD

(71) Applicant: KYOCERA Document Solutions Inc., Osaka (JP)

(72) Inventor: Akihiro Yamaguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 139 days.

(21) Appl. No.: 16/593,481

(22) Filed: Oct. 4, 2019

(65) Prior Publication Data
US 2020/0116248 A1 Apr. 16, 2020

(30) Foreign Application Priority Data
Oct. 15, 2018 (JP) .............................. JP2018-194492

(51) Int. Cl.
*F16H 7/02* (2006.01)
*G03G 15/00* (2006.01)
*F16H 55/36* (2006.01)
*G03G 21/16* (2006.01)

(52) U.S. Cl.
CPC .............. *F16H 55/36* (2013.01); *F16H 7/02* (2013.01); *G03G 15/757* (2013.01); *G03G 21/1647* (2013.01); *G03G 2215/00139* (2013.01); *G03G 2221/1651* (2013.01)

(58) Field of Classification Search
CPC .. G03G 15/757; G03G 15/80; G03G 21/1647; G03G 2215/00139; G03G 2221/1651; F16H 5/36; F16H 7/02; F16H 55/36
See application file for complete search history.

(56) References Cited

U.S. PATENT DOCUMENTS

| | | | |
|---|---|---|---|
| 9,334,931 B2 | 5/2016 | Yamaguchi et al. | |
| 2011/0193260 A1* | 8/2011 | Takeda | B29C 41/28 264/213 |
| 2012/0012230 A1* | 1/2012 | Tamiya | C21D 9/0068 148/320 |

(Continued)

FOREIGN PATENT DOCUMENTS

JP 2014-159865 A 9/2014

OTHER PUBLICATIONS

The extended European search report issued by the European Patent Office dated Apr. 2, 2020, which corresponds to European Patent No. 19200699.7-1009 and is related to U.S. Appl. No. 16/593,481.

*Primary Examiner* — Sophia S Chen
(74) *Attorney, Agent, or Firm* — Studebaker & Brackett PC

(57) ABSTRACT

A drive force transmission mechanism includes a drive pulley, a driven pulley and an endless belt. The endless belt is wound around the drive pulley and the driven pulley and transmits a rotation of the drive pulley to the driven pulley. At least one of the drive pulley and the driven pulley has a protruding part protruding outwardly in a radial direction around an outer circumferential face of the drive pulley or the driven pulley. The belt is a nonmagnetic metal belt having an outer circumferential face and an inner circumferential face. The outer circumferential face has a surface roughness smaller than a surface roughness of the inner circumferential face.

8 Claims, 5 Drawing Sheets

(56) References Cited

U.S. PATENT DOCUMENTS

2014/0235384 A1* 8/2014 Yamaguchi .......... G03G 15/757
  474/93
2015/0233445 A1   8/2015 Yamaguchi et al.
2017/0371290 A1* 12/2017 Mori ...................... G03G 15/80

* cited by examiner

DRIVE FORCE TRANSMISSION MECHANISM, IMAGE FORMING APPARATUS AND BELT MANUFACTURING METHOD

INCORPORATION BY REFERENCE

This application is based on and claims the benefit of priority from Japanese patent application No. 2018-194492 filed on Oct. 15, 2018, which is incorporated by reference in its entirety.

BACKGROUND

The present disclosure relates to a drive force transmission mechanism which employs a belt to transmit a drive force, an image forming apparatus including the drive force transmission mechanism and a manufacturing method for the belt.

An image forming apparatus, such as a printer and a copying machine, is provided with a photosensitive drum as an image carrier. The photosensitive drum is configured to be rotated around a rotational shaft to which a rotational force is transmitted from a motor by a drive force transmission mechanism.

The drive force transmission mechanism is sometimes configured to include a drive pulley fixed to an output shaft of the motor, a driven pulley fixed to the rotational shaft of the photosensitive drum and a belt wound around both the pulleys. A rotational force of the drive pulley rotating by the motor is transmitted to the driven pulley through the belt to rotate the photosensitive drum. In many cases, the belt is made of nonmagnetic metal material, such as SUS.

In the above drive force transmission mechanism, in order to rotate the photosensitive drum stably, the belt requires to have sufficient strength and durability. Various factors of the belt, such as a surface roughness and a rigidity, greatly contribute to the strength and the durability.

SUMMARY

In accordance with an aspect of the present disclosure, a drive force transmission mechanism includes a drive pulley, a driven pulley and an endless belt. The endless belt is wound around the drive pulley and the driven pulley and transmits a rotation of the drive pulley to the driven pulley. At least one of the drive pulley and the driven pulley has a protruding part protruding outwardly in a radial direction around an outer circumferential face of the drive pulley or the driven pulley. The belt is a nonmagnetic metal belt having an outer circumferential face and an inner circumferential face. The outer circumferential face has a surface roughness smaller than a surface roughness of the inner circumferential face.

In accordance with an aspect of the present disclosure, an image forming apparatus includes a photosensitive drum to be rotated by the drive force transmission mechanism.

In accordance with an aspect of the present disclosure, a manufacturing method for an endless belt wound around a drive pulley and a driven pulley to transmit a rotation of the drive pulley to the driven pulley includes a step for producing an endless belt body by a spinning processing using a nonmagnetic metal material; a step for low temperature annealing the belt body at a temperature of 420° C. or lower; and a step for film-polishing an outer circumferential face of the low temperature annealed belt body to have an average surface roughness Ra of 0.1 μm or smaller.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, an image forming apparatus and a drive force transmission mechanism according to an embodiment of the present disclosure will be described with reference to the drawings.

Figure 1:
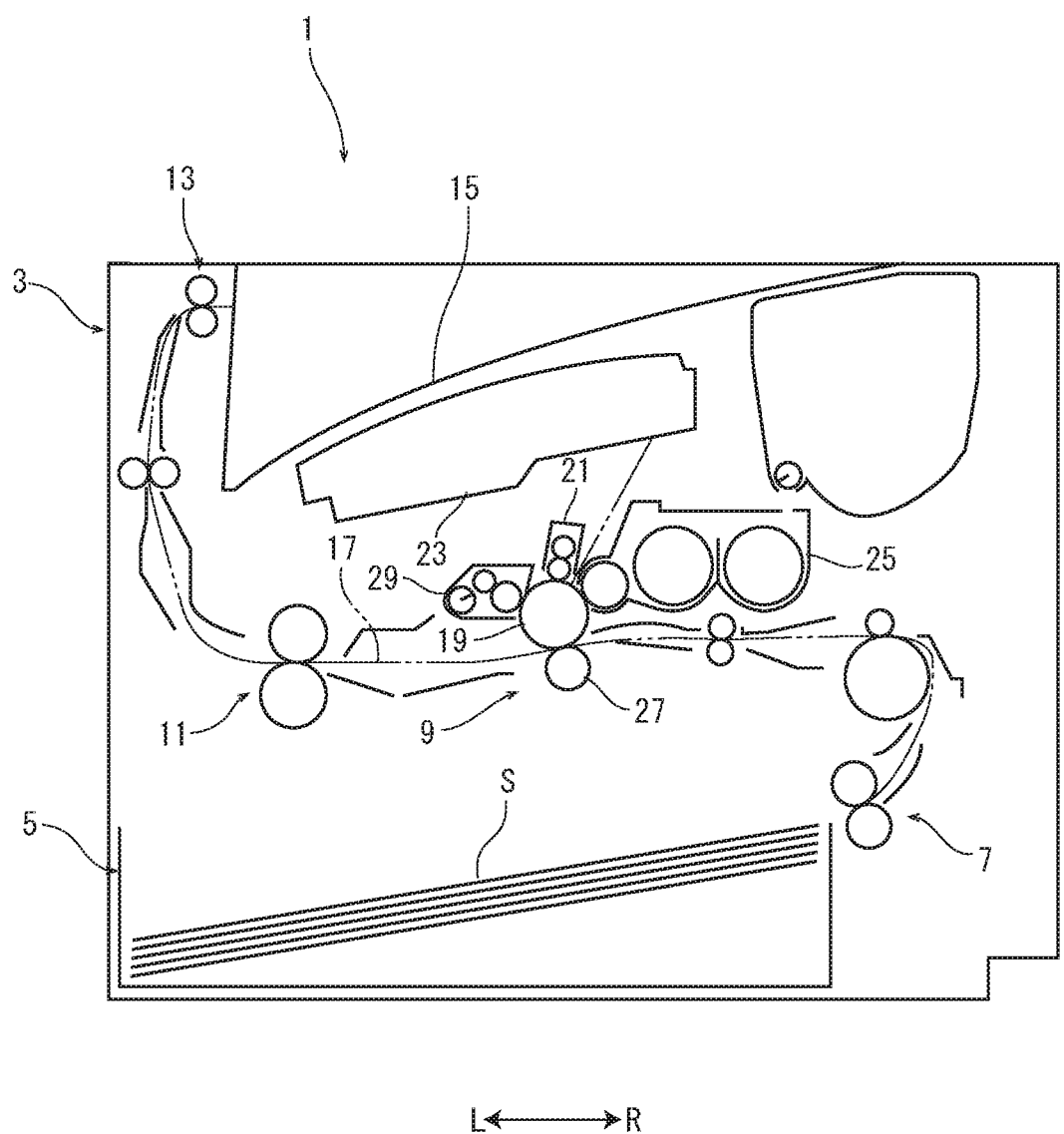
FIG. 1 is a front view schematically showing an inner structure of an image forming apparatus according to one embodiment of the present disclosure.

Firstly, with reference to FIG. 1, an entire structure of the image forming apparatus will be described. FIG. 1 is a front view schematically showing an inner structure of the image forming apparatus 1. In the following description, a near side (a front side) of a paper surface of FIG. 1 is defined to be a front side of the image forming apparatus 1, and a left-and-right direction is defined based on a direction in which the image forming apparatus 1 is viewed from the front side. In each figure, L and R respectively show a left side and a right side of the image forming apparatus 1.

An apparatus main body 3 of the image forming apparatus 1 is provided with a sheet feeding cassette 5 in which a sheet S is stored, a sheet feeding device 7 which feeds the sheet S from the sheet feeding cassette 5, an image forming part 9 which forms a toner image on the sheet S, a fixing device 11 which fixes the toner image on the sheet S, a sheet discharge device 13 which discharges the sheet S and an discharge tray 15 on which the discharged sheet S is stacked. In the apparatus main body 3, a conveyance path 17 for the sheet S is formed from the sheet feeding device 7 through the image forming part 9 and the fixing device 11 to the sheet discharge device 13.

The image forming part 9 includes a photosensitive drum 19, a charge device 21, an exposure device 23, a development device 25, a transfer roller 27 and a cleaning device 29. The photosensitive drum 19 is driven by a drive force transmission mechanism 31 (refer to FIG. 2), described later, to be rotated in the clockwise direction in FIG. 1. The charge device 21, the development device 25, the transfer roller 27 and the cleaning device 29 are disposed around the photosensitive drum 19 in the order in the rotational direction of the photosensitive drum 19.

The sheet S fed by the sheet feeding device 7 from the sheet feeding cassette 5 is conveyed to the image forming part 9 along the conveyance path 17. In the image forming part 9, the photosensitive drum 19 is firstly charged to a predetermined surface potential while driven by the drive force transmission mechanism 31 to be rotated. Then, the photosensitive drum 19 is exposed with the exposure device 23, and an electrostatic latent image is formed on the photosensitive drum 19. Next, the electrostatic latent image is developed to a toner image by the development device 25. Then, the toner image is transferred on the conveyed sheet S by the transfer roller 27. The sheet S to which the toner image is transferred is conveyed along the conveyance path 17 to the fixing device 11. The fixing device 11 fixes the toner image to the sheet S. The sheet S to which the toner image is fixed is discharged by the discharge device 13 and then stacked on the discharge tray 15. The toner remaining on the surface of the photosensitive drum 19 is removed by the cleaning device 29.

Figure 2:
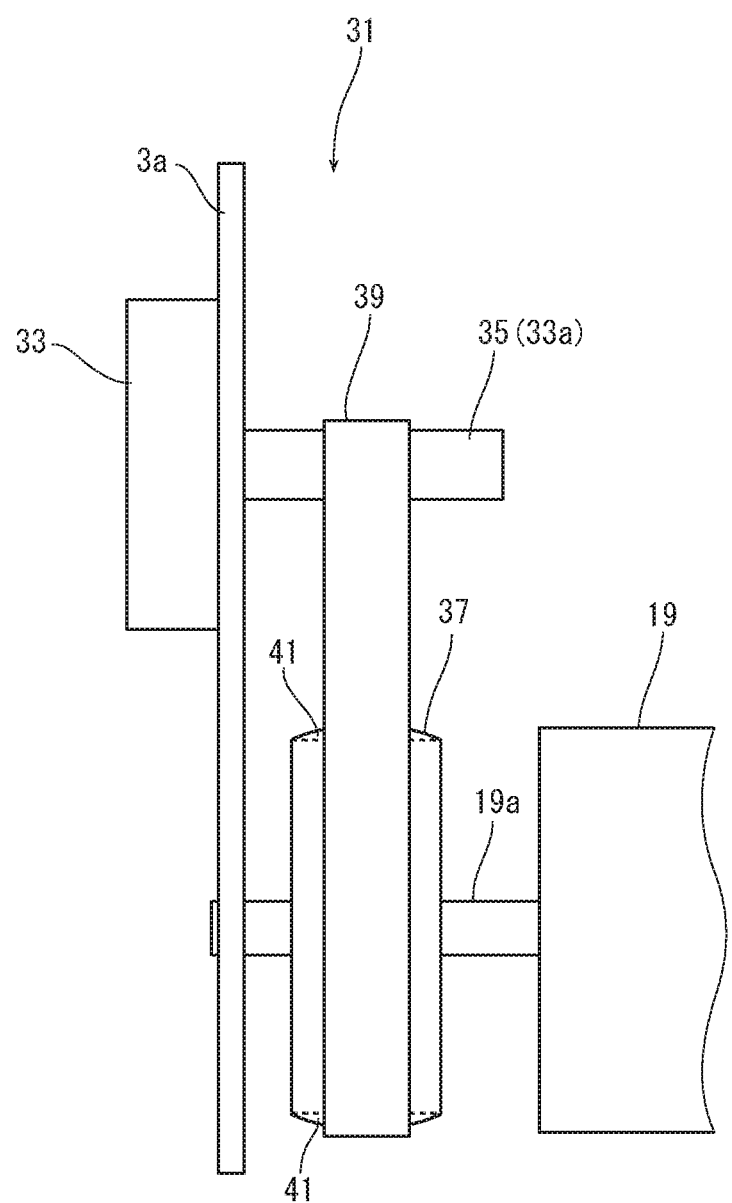
FIG. 2 is a side view showing a drive force transmission mechanism according to the embodiment of the present disclosure.

Next, with reference to FIG. 2, the drive force transmission mechanism 31 will be described. FIG. 2 is a side view showing the drive force transmission mechanism.

The drive force transmission mechanism 31 includes a motor 33 as a drive source, a drive pulley 35, a driven pulley 37 and a belt 39 wound around both the drive pulley 35 and the driven pulley 37.

The motor 33 is fixed to a side plate 3a of the apparatus main body 3. An output shaft 33a of the motor 33 is protruded to the inside of the apparatus main body 3 through the side plate 3a.

In the present embodiment, the output shaft 33a of the motor 33 serves as the drive pulley 35. The drive pulley 35 is made of nonmagnetic material. A diameter of the drive pulley 35 (the output shaft 33a) is 8 mm or larger. Alternatively, the drive pulley 35 may be prepared separately from the output shaft 33a, and the prepared drive pulley 35 may be fixed to the output shaft 33a of the motor 33.

The driven pulley 37 is fixed to an end portion of a rotational shaft 19a of the photosensitive drum 19. The driven pulley 37 is made of nonmagnetic material, and has a diameter larger than a diameter of the drive pulley 35 (the output shaft 33a of the motor 33). Around an outer circumferential face of the driven pulley 37, a protruding part 41 is formed to be protruded outwardly in a radial direction of the driven pulley 37. The protruding part 41 has a crown shape in which a center portion in the thickness direction of the driven pulley 37 is protruded more outwardly in the radial direction than end portions in the thickness direction.

The belt 39 is a seamless endless belt. The belt 39 is made of nonmagnetic metal material, such as SUS 304 (austenitic stainless steel). A manufacturing method of the belt 39 will be described later. The belt 39 has a Vickers hardness of 490 Hv or larger, or a tensile strength of 1500 MPa or larger. An outer circumferential face of the belt 39 is made to be a mirror face having an average surface roughness Ra of 0.1 μm or smaller, and an inner circumferential face of the belt 39 has an average surface roughness Ra of 0.3 μm or smaller.

The belt 39 is wound around the drive pulley 35 and the driven pulley 37. Because the protruding part 41 is formed around the outer circumferential face of the driven pulley 37, the belt 39 mainly comes into contact with the largest diameter portion of the protruding part 41 when wound around the driven pulley 37.

In the drive force transmission mechanism 31 having the above described configuration, when the motor 33 is rotated, the drive pulley 35 is rotated to rotate the driven pulley 37 through the belt 39. Then, the rotational shaft 19a to which the driven pulley 37 is fixed is rotated to rotate the photosensitive drum 19.

As described above, according to the drive force transmission mechanism 31 of the present disclosure, an average surface roughness of the outer circumferential face of the belt 39 is smaller than an average surface roughness of the inner circumferential face of the belt 39. Specifically, the outer circumferential face of the belt 39 is a mirror face having an average surface roughness Ra of 0.1 μm or smaller, and the inner circumferential face of the belt 39 has an average surface roughness Ra of 0.3 μm or smaller. Thereby, when the belt 39 is wound around both the pulleys 35 and 37, a strong tensile strength generates on the outer circumferential face and a compressive stress remains on the inner circumferential face so that the belt 39 is easily curled. Accordingly, it becomes possible to travel the belt 39 stably. Additionally, because the belt 39 has a Vickers hardness of 490 Hv or larger, it becomes possible to obtain a high rigidity and to prevent a plastic deformation of the belt 39 owing to a load stress at the rotating of the photosensitive drum 19. Therefore, it becomes possible to rotate the photosensitive drum 19 stably for a long period.

Additionally, because the protruding part 41 is formed around the outer circumferential face of the driven pulley 37, it becomes possible to restrict the belt 39 from being displaced in the thickness direction of the driven pulley 37. That is, the belt 39 mainly comes into contact with the largest diameter portion (the center portion of the outer circumferential face in the thickness direction) of the protruding part 41. Then, a frictional heat is generated between the belt 39 and the largest diameter portion of the protruding part 41, and the largest diameter portion of the protruding part 41 further expands outwardly owing to the generated heat. As a result, a frictional force between the belt 39 and the protruding part 41 is further heightened to prevent the displacement of the belt 39 in the thickness direction of the driven pulley 37. The drive pulley 35 may have the same protruding part around the outer circumferential face as that of the driven pulley 37.

Additionally, as the diameter of the pulley is small, a tensile strength becomes large and a durability of the belt becomes poor. Then, both the pulleys 35 and 37 are made to have the diameter of 8 mm or larger so that it becomes possible to restrict deterioration of a durability of the belt 39.

Figure 3:
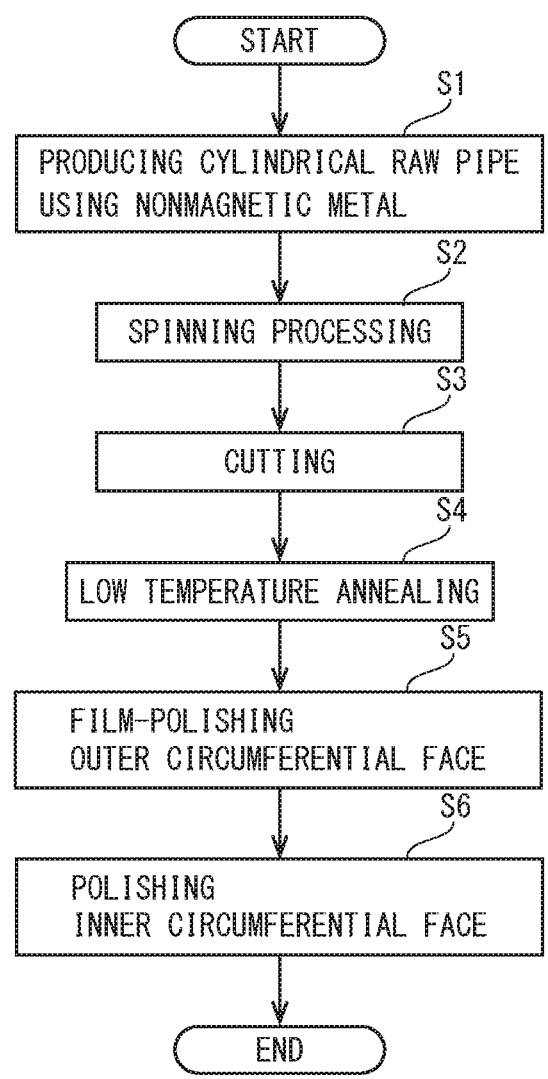
FIG. 3 is a flowchart showing a belt manufacturing method according to the embodiment of the present disclosure.

Next, a manufacturing method of the belt 39 will be described with reference to the flowchart shown in FIG. 3.

Firstly, at step S1, a nonmagnetic metal material, such as a SUS 304 material, is prepared, and the metal material is processed into a cylindrical raw pipe. Next, at step S2, the cylindrical raw pipe is subjected to a spinning processing to be plastically deformed to have a thickness of 30 μm. The spinning processing is a processing in which a plurality of rollers is pressed on an outer circumferential face of the raw pipe while rotating the raw pipe to plastically deform the raw pipe so as to have a uniform thickness.

Then, at step S3, the raw pipe after subjected to the spinning processing is cut into a seamless belt body having a predetermined width.

Next, at step S4, the belt body is subjected to a low temperature annealing at a temperature of 420° C. or lower. By the low temperature annealing, the belt body is cured to have a Vickers hardness of 490 Hv or larger. Conventionally, by the low temperature annealing, a surface of the belt is changed in color to dark brown. However, if the low temperature annealing is performed under a nonoxygen environment, the surface of the belt is not always changed in color to dark brown.

Next, at step S5, an outer circumferential face of the annealed belt body is polished using a film to be a mirror face having an average surface roughness Ra of 0.1 μm or smaller.

Then, at step S6, an inner circumferential face of the annealed belt body is processed to have an average surface roughness Ra of 0.3 µm or smaller. In this case, the polishing processing using a film is not always required.

Next, a relationship between a surface roughness and a durability, and a relationship between a rigidity and a durability will be described based on an experimental result. Because it is conventionally known that the rigidity and a tensile strength have a correlation, a relationship between a surface roughness and a durability, and a relationship between a tensile strength and a durability will be described with reference to graphs shown in FIG. 4 and FIG. 5.

Firstly, with reference to the graph shown in FIG. 4, a relationship between a surface roughness and a durability will be described. A horizontal axis of the graph shows a number of repeated folding time (number) of a test piece and a vertical axis shows a surface roughness Rz (µm) of the test piece. It is shown that as the number of repeated folding time is increased, the durability becomes better. A diamond-shaped plot shows the number of repeated folding times at which a break (a break on an end face of the test piece) is observed on the test piece having the corresponding surface roughness Rz.

Figure 4:
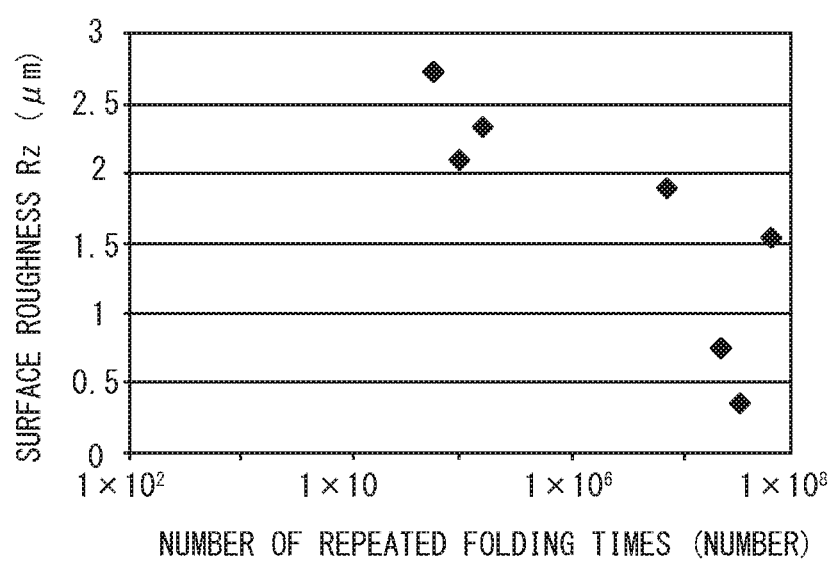
FIG. 4 is a graph showing a relationship between a surface roughness and a number of repeated folding times.

As understood by the graph shown in FIG. 4, as the surface roughness Rz is small, the number of repeated folding times becomes larger. That is, it is understood that as the surface roughness Rz is small, the durability becomes better.

Next, with reference to the graph shown in FIG. 5, a relationship between a tensile strength and a durability will be described. A horizontal axis of the graph shows a number of repeated folding time (number) of a test piece and a vertical axis shows the tensile strength (MPa) of the test piece. A diamond-shaped plot shows the number of repeated folding times at which a break (a break on an end face of the test piece) is not observed on the test piece having the corresponding surface roughness Rz. A rectangular plot shows the number of repeated folding times at which a break (a break on an end face of the test piece) is observed on the test piece having the corresponding surface roughness Rz.

Figure 5:
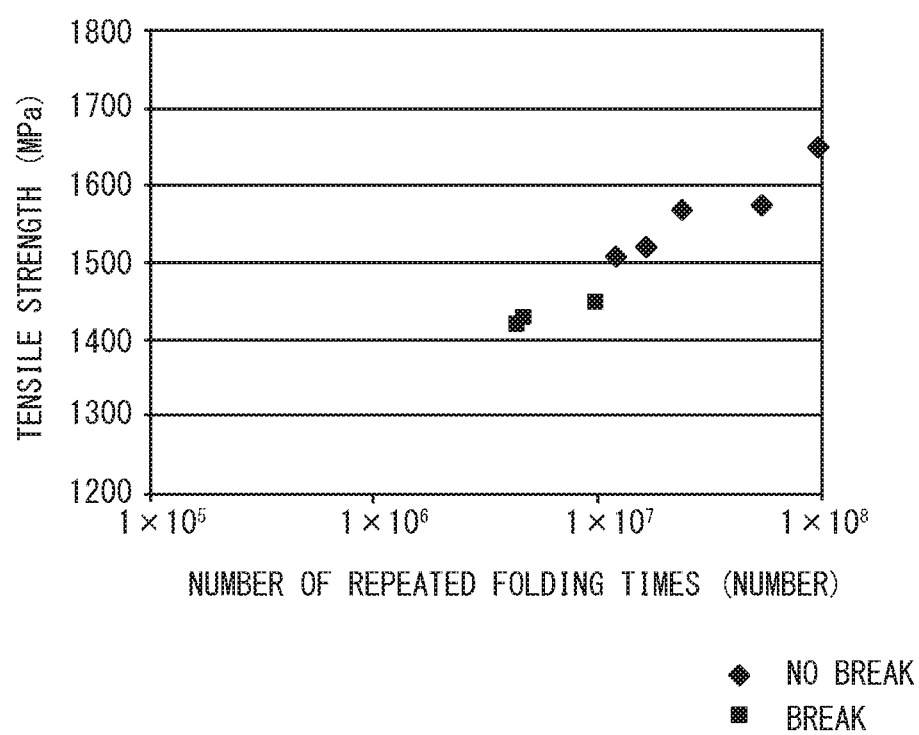
FIG. 5 is a graph showing a relationship between a tensile strength and a number of repeated folding times.

As shown in FIG. 5, it is understood that in a case where the tensile strength is high, even if the number of repeated folding times is increased, the break is not observed. That is, it is understood that as the rigidity becomes higher, the durability becomes better. Especially, a tensile strength larger than 1500 MPa shows a good durability.

The above experimental result shows that the belt 39 having a Vickers hardness of 490 Hv or larger, like the present embodiment, exhibits a high strength and a high durability. Additionally, the belt 39 having the outer circumferential face formed in a mirror face having an average surface roughness Ra of 0.1 µm or smaller and the inner circumferential face having an average surface roughness of 0.3 µm or smaller exhibits a high durability.

While the present disclosure has been described with reference to the particular illustrative embodiments, it is not to be restricted by the embodiments. It is to be appreciated that those skilled in the art can change or modify the embodiments without departing from the scope and spirit of the present disclosure.

The invention claimed is:

1. A drive force transmission mechanism comprising:
a drive pulley;
a driven pulley; and
an endless belt wound around the drive pulley and the driven pulley and transmitting a rotation of the drive pulley to the driven pulley,
wherein at least one of the drive pulley and the driven pulley has a protruding part protruding outwardly in a radial direction around an outer circumferential face of the drive pulley or the driven pulley, and
the belt is a nonmagnetic metal belt having an outer circumferential face and an inner circumferential face, in which the outer circumferential face has a surface roughness smaller than a surface roughness of the inner circumferential face and is a mirror face having an average surface roughness Ra of 0.1 µm or smaller.

2. The drive force transmission mechanism according to claim 1,
wherein the inner circumferential face of the belt has an average surface roughness Ra of 0.3 µm or smaller.

3. The drive force transmission mechanism according to claim 1,
wherein the belt has a Vickers hardness of 490 Hv or larger.

4. The drive force transmission mechanism according to claim 1,
wherein the belt has a tensile strength of 1500 MPa or larger.

5. The drive force transmission mechanism according to claim 1,
wherein the drive pulley or the driven pulley has a diameter of 8 mm or larger.

6. The drive force transmission mechanism according to claim 1,
wherein the driven pulley has a diameter larger than a diameter of the drive pulley, and
the protruding part is formed around the outer circumferential face of the driven pulley.

7. The drive force transmission mechanism according to claim 1,
wherein the protruding part has a crown shape where a center portion in a thickness direction of the drive pulley or the driven pulley is protruded more outwardly than end portions in the thickness direction.

8. An image forming apparatus comprising a photosensitive drum to be rotated by the drive force transmission mechanism according to claim 1.

* * * * *